(12) United States Patent
Yamagishi et al.

(10) Patent No.: US 11,435,201 B2
(45) Date of Patent: Sep. 6, 2022

(54) INFORMATION PROCESSING SYSTEM AND INFORMATION PROCESSING DEVICE

(71) Applicant: HONDA MOTOR CO., LTD., Tokyo (JP)

(72) Inventors: Yusuke Yamagishi, Wako (JP); Kazuhiro Ito, Wako (JP); Yoji Motegi, Wako (JP); Susumu Saito, Wako (JP); Shinji Kawasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 696 days.

(21) Appl. No.: 16/349,487

(22) PCT Filed: Dec. 28, 2016

(86) PCT No.: PCT/JP2016/089164
§ 371 (c)(1),
(2) Date: May 13, 2019

(87) PCT Pub. No.: WO2018/123041
PCT Pub. Date: Jul. 5, 2018

(65) Prior Publication Data
US 2020/0191590 A1 Jun. 18, 2020

(51) Int. Cl.
*G01C 21/34* (2006.01)
*G06N 20/00* (2019.01)
*G06N 5/04* (2006.01)
(52) U.S. Cl.
CPC .......... *G01C 21/3484* (2013.01); *G06N 5/04* (2013.01); *G06N 20/00* (2019.01)

(58) Field of Classification Search
CPC ....... G01C 21/3484; G06N 20/00; G06N 5/04
See application file for complete search history.

(56) References Cited

U.S. PATENT DOCUMENTS

| 2010/0205060 A1 | 8/2010 | Athsani et al. |
| 2012/0191338 A1 | 7/2012 | French et al. |
| 2014/0309933 A1 | 10/2014 | Shin et al. |

FOREIGN PATENT DOCUMENTS

| JP | 2006-288950 | 10/2006 |
| JP | 2012-113542 | 6/2012 |
| JP | 2016-121879 | 7/2016 |

(Continued)

OTHER PUBLICATIONS

English Translation of WO 2015/162949 A1 retrieved from https://patentscope.wipo.int/search/en/detail.jsf?docId=WO2015162949 (Year: 2022).*

(Continued)

*Primary Examiner* — Calvin Cheung
(74) *Attorney, Agent, or Firm* — Rankin, Hill & Clark LLP

(57) ABSTRACT

An information processing system and an information processing device that are capable of reflecting an emotion of a user and performing route search. In an information processing system including a search unit that performs the route search on the basis of route search information that is input, to output a result searched by the search unit, the search unit performs the route search on the basis of the route search information, and emotion information obtained from an artificial intelligence module that generates an emotion of the same quality as in an emotion of a searcher.

5 Claims, 10 Drawing Sheets

(56) References Cited

FOREIGN PATENT DOCUMENTS

| | | | |
|---|---|---|---|
| JP | 2016-127677 | 7/2016 | |
| JP | 2016-151548 | 8/2016 | |
| JP | 2017181449 A * | 10/2017 | ............ G01C 21/34 |
| KR | 2010-0089218 A | 8/2010 | |
| NO | 2007/088686 A1 | 8/2007 | |
| WO | 2014/132802 | 9/2014 | |
| WO | 2015/162949 | 10/2015 | |
| WO | 2016/092920 A1 | 6/2016 | |
| WO | 2016/121174 | 8/2016 | |

OTHER PUBLICATIONS

International Preliminary Report on Patentability dated Jul. 11, 2019, 8 pages.

Japanese Decision of Refusal with English translation dated Aug. 31, 2021, 3 pages.

Japanese Decision of Dismissal of Amendment with English translation dated Aug. 31, 2021, 7 pages.

European Office Action, 16925870.4-1001, dated Feb. 9, 2021, 6 pages.

Indian Office Action, 201947026757, dated Feb. 10, 2021, 6 pages.

International Search Report, dated Mar. 28, 2017 (Mar. 28, 2017), 2 pages.

Masayuki Hayashi, "Smart Machines First Edition", Kabushikaisha Yosensha, first edition.

For the purpose of commercializing personal AII—artificial intelligence—second cooking suspension support system—electronic Society, Electronic Industry Monthly Report vol. 30, No. 9, Japan, Electronic Industry Development Association, vol. 30.

European Office Action dated Dec. 10, 2021, 6 pages.

European Office Action dated Jul. 21, 2020, 8 pages.

Japanese Office Action with English translation dated Dec. 10, 2019, 9 pages.

Japanese Office Action with English translation dated Jan. 12, 2021, 10 pages.

European Search Report dated Nov. 22, 2019, 11 pages.

Japanese Office Action (with English translation) dated Jun. 9, 2020, 7 pages.

Masayuki Hayashi, "Smart Machines First Edition", Kabushikaisha Yosensha, first edition Date Unknown.

For the purpose of commercializing personal All - artificial intelligence - second cooking suspension support system -electronic Society, Electronic Industry Monthly Report vol. 30, No. 9, Japan, Electronic Industry Development Association, vol. 30 Date Unknown.

* cited by examiner

INFORMATION PROCESSING SYSTEM AND INFORMATION PROCESSING DEVICE

TECHNICAL FIELD

The present invention relates to an information processing system and an information processing device.

BACKGROUND ART

Heretofore, there has been suggested a technology that relates to route search and that includes reflecting various elements other than time required until a destination is reached, and performing the route search. For example, in Patent Literature 1, a route searching technology is disclosed in which time required to spend outdoors during transfer is short. Furthermore, for example, in Patent Literature 2, a technology is disclosed in which objective route search is not performed, and in order to support new finding by a user, priorities of route selection are predetermined and detour routes that fit user's preference can be presented. Additionally, for example, in Patent Literature 3, a technology is disclosed in which a relationship of a plurality of users is taken into consideration and an optimum route search result (guide information) is presented.

CITATION LIST

Patent Literature

[Patent Literature 1]
   Japanese Patent Laid Open No. 2016-151548
[Patent Literature 2]
   Japanese Patent Laid Open No. 2016-127677
[Patent Literature 3]
   International Publication No. 2016/121174

SUMMARY OF INVENTION

Technical Problem

Here, as for route search, it is assumed that a route that a user desires varies with user's emotion. Consequently, if a result of route search in which the user's emotion is reflected can be presented to the user, user's convenience can be improved. However, in Patent Literatures 1 to 3, description is not made as to a technology of reflecting the user's emotion during the route search.

An object of the present invention is to provide an information processing system and an information processing device which are capable of reflecting an emotion of a user and searching for a route.

Solution to Problem

To achieve the above object, according to the present invention, there is provided an information processing system (1) including a search unit (201) that performs route search on the basis of route search information that is input, to output a result of the search performed by the search unit, wherein the search unit performs the route search on the basis of the route search information, and emotion information obtained from artificial intelligence (M) that generates an emotion of the same quality as in an emotion of a searcher.

According to this configuration, the information processing system can reflect user's emotion and search for a route suited for a user during the route search.

Furthermore, in the present invention, the emotion generated by the artificial intelligence is generated on the basis of at least information that is input by the searcher and information based on an activity of the searcher.

According to this configuration, the artificial intelligence can reflect the searcher's input and the searcher's activity and accurately generate the emotion of the same quality as in the searcher's emotion.

Additionally, in the present invention, the search unit performs the route search on the basis of selection information on a route selected as a route to be utilized by the searcher in the past, in addition to the route search information and the emotion information.

According to this configuration, the search unit can reflect the selection of the route performed by the searcher in the past and accurately search for the route during the route search.

Furthermore, in the present invention, a target of a route to be searched by the search unit includes a route along which the searcher moves by using a vehicle.

According to this configuration, the search unit can reflect the searcher's emotion and search for various routes also on the assumption that the searcher moves by using the vehicle.

Additionally, in the present invention, the artificial intelligence generates the emotion of the searcher to the movement by the vehicle.

According to this configuration, the search unit can reflect the searcher's emotion and appropriately judge validity of the searching for the route involving the movement by the vehicle.

Furthermore, in the present invention, the route search information includes information on a departure point and information on a destination, and additionally includes information on a transit point when the transit point to pass before reaching the destination is set, and the search unit reflects movement to the transit point and movement from the transit point and performs the route search, when the route search information includes the information on the transit point.

According to this configuration, the search unit can accurately search for the route on the basis of presence of the transit point, when the transit point is set.

Additionally, to achieve the above object, according to the present invention, there is provided an information processing device (2) including an input unit (12) into which route search information is input, an output unit (12) that outputs a result of route search, and a control unit (10) that controls the input unit and the output unit, wherein the control unit controls the output unit to output the result of the route search performed on the basis of the route search information input into the input unit and emotion information obtained from artificial intelligence that generates an emotion of the same quality as in an emotion of a searcher.

According to this configuration, the information processing device can present, to a user, the route searched so that user's emotion is reflected.

Advantageous Effects of Invention

According to a first aspect of the present invention, an information processing system can reflect user's emotion and search for a route suited for a user during route search.

According to a second aspect of the invention, artificial intelligence can reflect information that is input by a searcher and searcher's activity and accurately generate an emotion of the same quality as in searcher's emotion. The emotion close to the searcher's emotion is generated, so that the search can be performed more closely to the emotion.

According to a third aspect of the invention, a search unit can reflect route selection performed by the searcher in the past and accurately search for the route during the route search. A result of the route selection performed in the past is data that actually reflects the emotion, and it is possible to perform the search more closely to the emotion, when another piece of information during the selection and the selection result are reflected. As an example, in case of previously selecting a bus, not walking, on a rainy day, search is performed by granting more priority to the bus than to the walking if it rains on the day.

According to a fourth aspect of the invention, the search unit enables the search for the route along which movement means, other than the walking and public transportation, includes a taxi (including a dispatch service), and a vehicle (including an automobile, a two-wheeled vehicle or a bicycle) to be rented or shared, thereby enabling the search from a larger number of choices. That is, the searcher's emotion can be reflected and various routes can be searched.

According to a fifth aspect of the invention, the route search based on the searcher's emotion to the movement by the vehicle can be performed.

According to a sixth aspect of the invention, the search unit can accurately perform route search based on presence of a transit point, when the transit point is set. Note that the transit point means not only a specified place such as a station of the public transport but also an arbitrary point. When the search can be performed on the basis of the arbitrary point as the transit point, an entire action during the movement can be optimized.

According to a seventh aspect of the invention, the information processing device can present, to the user, the route searched so that the user's emotion is reflected.

DESCRIPTION OF EMBODIMENTS

Hereinafter, embodiments of the present invention will be described with reference to the drawings.

Figure 1:
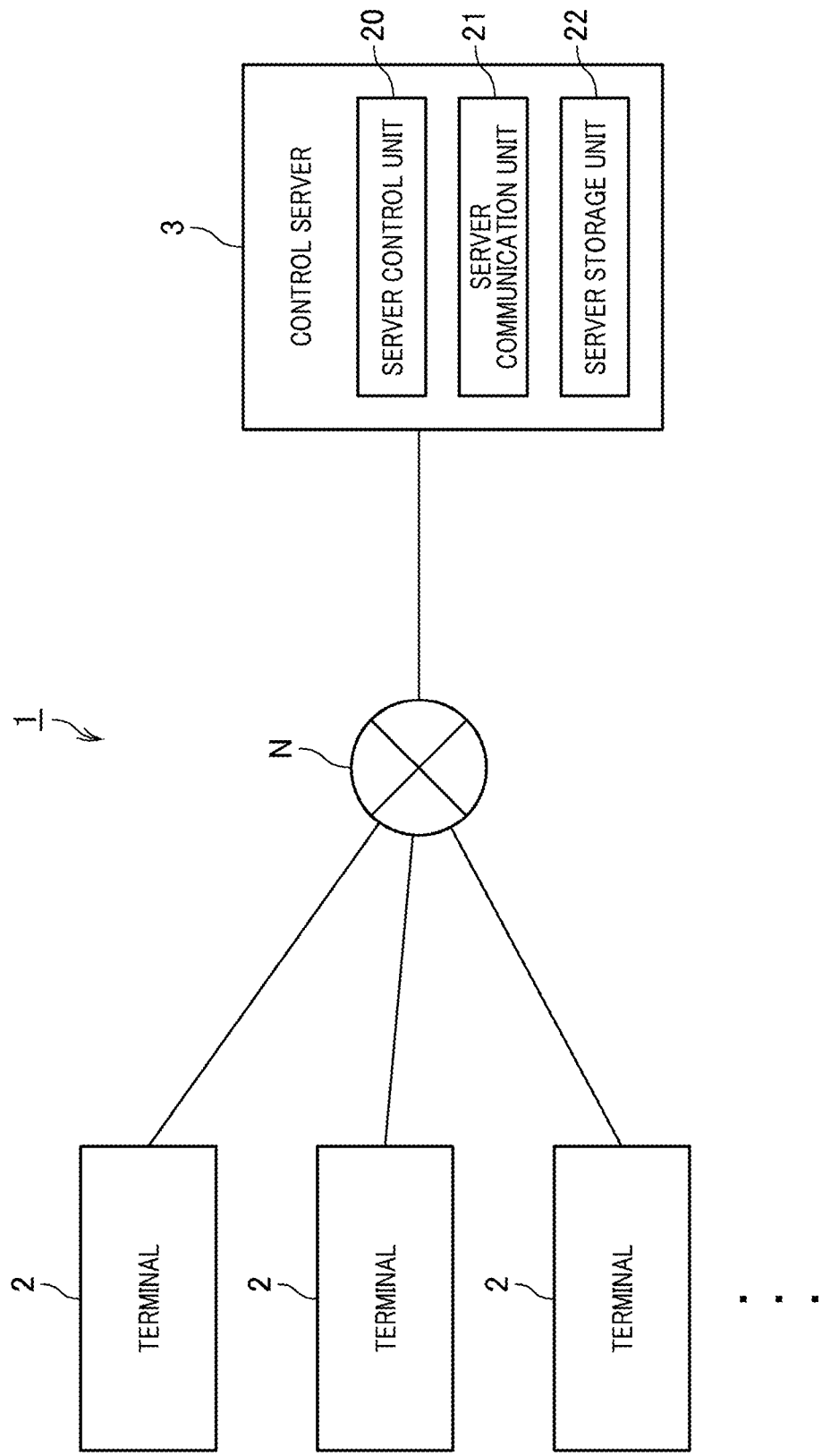
FIG. 1 is a diagram showing a configuration of an information processing system.

FIG. 1 is a diagram showing a configuration of an information processing system 1 according to the present embodiment.

The information processing system 1 is a system that searches for a route to a destination in response to user's request, and presents a result of the route search to a user. As described later, in the information processing system 1, it is possible to perform the route search so that user's emotion is reflected and to present the route suited for the user.

As shown in FIG. 1, the information processing system 1 includes a plurality of terminals 2 (information processing devices) connected to a network N including the Internet, a telephone network and another communication network. The information processing system 1 includes a control server 3 (an information processing device) connected to the network N. The terminal 2 can communicate with the control server 3 via the network N. Any communication protocol may be used in the communication between the terminal 2 and the control server 3. Examples of the communication protocol include HTTP and Web Socket. Details are omitted, but secure communication is performed between the terminal 2 and the control server 3 by the existing encryption technology, a virtual dedicated line technology or the like.

The terminal 2 is a user operable device, and includes at least an input unit (a screen or the like) into which information is input, and an output unit (a screen or the like) that outputs the information. Examples of the terminal 2 include a tablet computer, a mobile phone (e.g., a so-called smartphone), a notebook computer, and a desktop computer. In the present embodiment, an embodiment of the terminal 2 will be described as a tablet computer possessed by the user.

The control server 3 is a server device for the terminal 2 that is one of clients. The control server 3 provides a route search service (described later). Note that FIG. 1 shows the control server 3 in one block, but it is not meant that the control server 3 includes a single server device. For example, the control server 3 may include a plurality of server devices, or may be a part of a predetermined system. The other examples may include a server that individually manages respective databases, and a server for a mobile terminal in which a part of each database is present. That is, the control server 3 may have any form as long as the server can execute various processing as described later.

Figure 2:
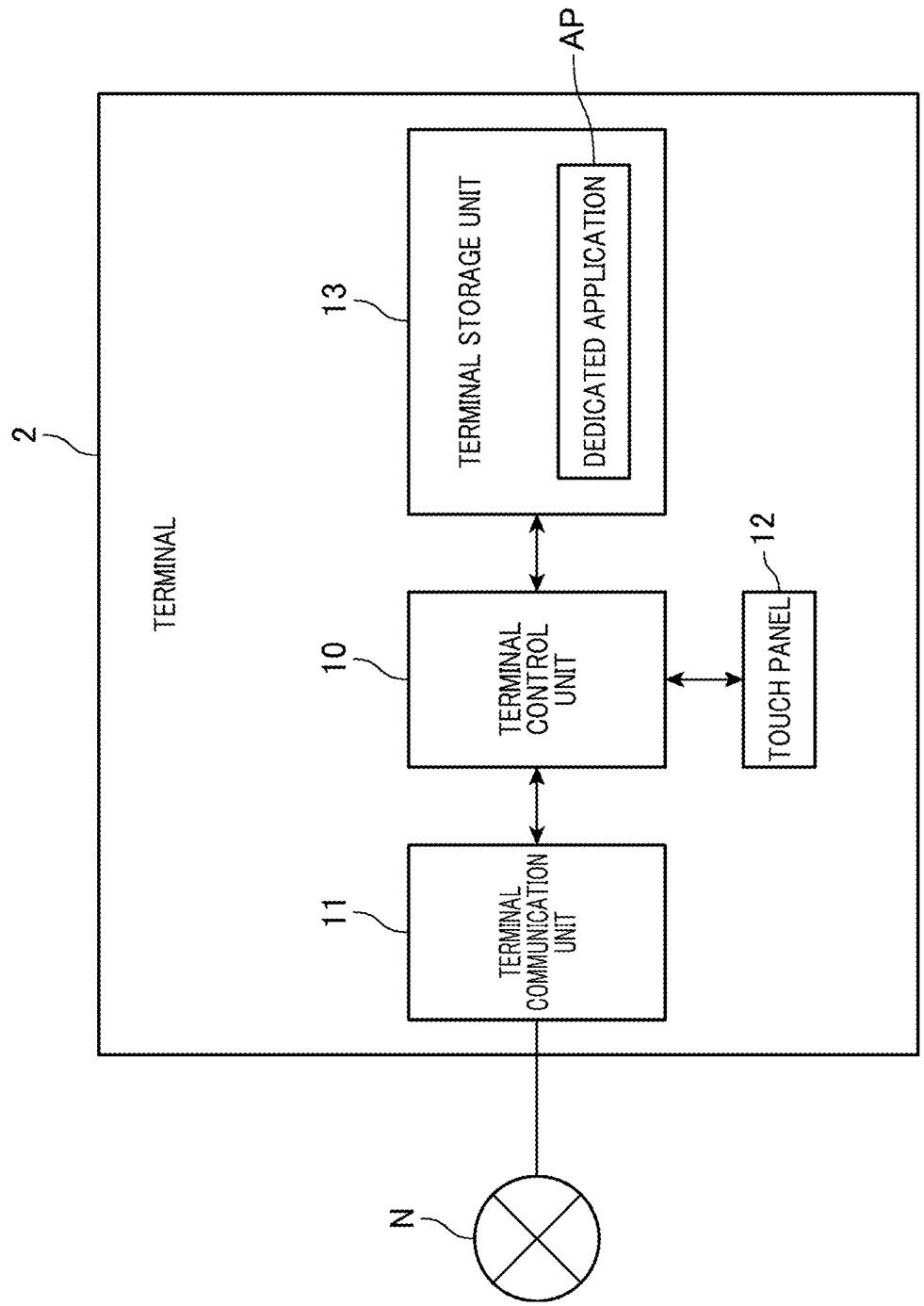
FIG. 2 is a block diagram showing a functional configuration of a terminal.

FIG. 2 is a block diagram showing a functional configuration of the terminal 2.

The terminal 2 is a tablet computer in which a touch panel 12 is provided in a broad area of a front surface.

As shown in FIG. 2, the terminal 2 includes a terminal control unit 10 (a control unit), a terminal communication unit 11, the touch panel 12 (an input unit) (an output unit), and a terminal storage unit 13.

The terminal control unit 10 includes a CPU, a ROM, a RAM, an ASIC, a signal processing circuit and the like, and controls respective parts of the terminal 2. In the terminal control unit 10, for example, the CPU reads a program stored in the ROM to the RAM to execute processing. Alternatively, for example, the processing is executed by a function mounted in the ASIC. Alternatively, for example, the processing is executed by performing signal processing in the signal processing circuit. Thus, the processing is executed by hardware and software.

The terminal communication unit 11 accesses the network N in accordance with the control of the terminal control unit 10, and communicates with external devices (including the control server 3) connected to the network N according to a predetermined communication protocol.

The touch panel (an interface) 12 includes a display panel such as a liquid crystal display panel or an organic EL panel, and displays information in the display panel in accordance with the control of the terminal control unit 10. Furthermore, the touch panel 12 includes a touch sensor superimposed and arranged on the display panel, and detects an operation to the touch panel 12 by the user, and outputs a signal corresponding to the detected operation to the terminal control unit 10. The terminal control unit 10 executes processing corresponding to the operation to the touch panel 12 by the user on the basis of an input from the touch panel 12.

The touch panel 12 functions as "the input unit" into which route search information is input, and as "the output unit" that displays (outputs) the result of the route search.

The terminal storage unit 13 includes a nonvolatile memory such as an EEPROM, and rewritably stores various data in a nonvolatile manner.

The terminal storage unit 13 stores a dedicated application AP. The dedicated application AP is an application for use in a case where the route search service provided by the control server 3 is utilized by the user as described later. The dedicated application AP is, for example, an application provided by a service provider that will be described later, and installed in the terminal 2 with predetermined means by the user.

Figure 3:
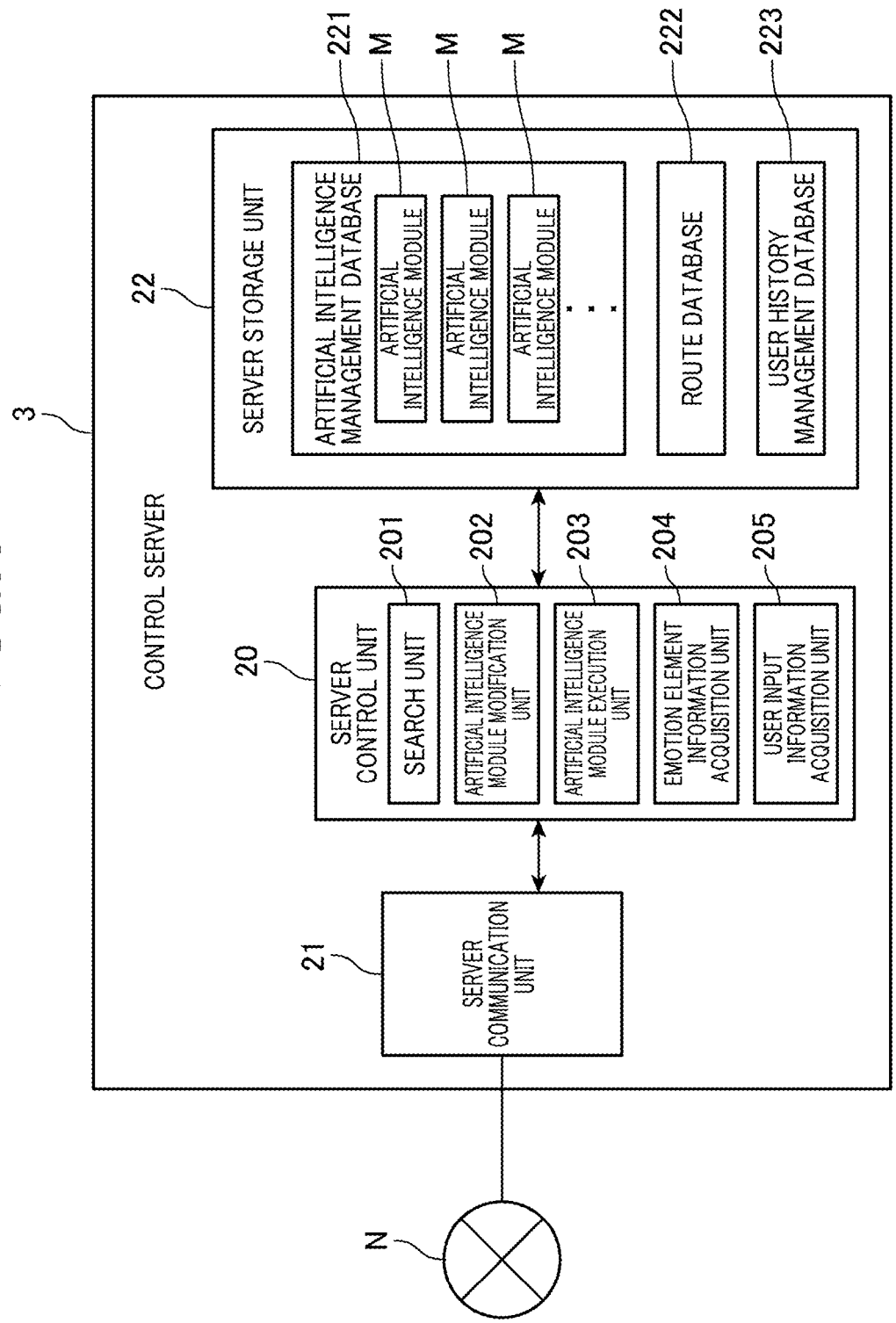
FIG. 3 is a block diagram showing a functional configuration of a control server.

FIG. 3 is a block diagram showing a functional configuration of the control server 3.

The control server 3 is a server device for the terminal 2 that is one of the clients.

As shown in FIG. 3, the control server 3 includes a server control unit 20, a server communication unit 21, and a server storage unit 22.

The server control unit 20 includes a CPU, a ROM, a RAM, an ASIC, a signal processing circuit and the like, and controls respective parts of the control server. In the server control unit 20, for example, the CPU reads a program stored in the ROM to the RAM to execute processing. Alternatively, for example, the processing is executed by a function mounted in the ASIC. Alternatively, for example, the processing is executed by performing signal processing in the signal processing circuit. Thus, the processing is executed by hardware and software.

The server control unit 20 includes, as function blocks, a search unit 201, an artificial intelligence module modification unit 202, an artificial intelligence module execution unit 203, an emotion element information acquisition unit 204, and a user input information acquisition unit 205. These function blocks execute processing in cooperation with the hardware and software. For example, the CPU reads the program stored in the ROM to the RAM and executes the processing. These function blocks will be described later.

The server communication unit 21 accesses the network N in accordance with the control of the server control unit 20, and communicates with the external devices (including the terminal 2) connected to the network N according to the predetermined communication protocol.

The server storage unit 22 includes a nonvolatile memory such as a hard disk or an EEPROM, and rewritably stores various data in a nonvolatile manner.

The server storage unit 22 stores an artificial intelligence management database 221, a route database 222, and a user history management database 223. These pieces of data will be described later.

Meanwhile, as described above, the control server 3 according to the present embodiment provides the route search service. The route search service is a service of performing route search to a destination designated by the user in response to user's (searcher's) request, and outputting the result of the route search. Note that in the present embodiment, a route to the destination means the route from when the user departs from a departure point until reaching the destination by utilizing one or more transportations (the transportations also include "walking") in a situation where the transportation to be used for the user to reach the destination is not limited to specific means.

Here, as for the route search, it is assumed that the route that the user desires varies with user's emotion. Therefore, when the route search is performed so that the user's emotion is reflected and the result of the route search can be presented to the user, user's convenience can be improved.

On the basis of the above, the control server 3 and the terminal 2 according to the present embodiment execute the following processing.

Here, as for the route search service provided by the control server 3, the user who wants to use the service performs user registration in advance. The user registration is appropriately performed by a predetermined company (hereinafter referred to as "the service provider"). Identification information (hereinafter referred to as "user identification information") with which the user is identified is issued to the user who has completed the user registration by the service provider. The user identification information is notified to the user in a predetermined method by the service provider. The invention is not limited to new user registration, and there may be used user identification information (so-called ID) that is already possessed while sharing of user information already registered in another service is permitted.

Hereinafter, description will be first made as to the artificial intelligence management database 221 of the server storage unit 22 of the control server 3.

Note that in the present embodiment, a "module" means a program (including data for use by the program) that allows an entity having a predetermined function and executing computation processing of the CPU or the like to execute processing based on the predetermined function.

The artificial intelligence management database 221 has a record for each user who has completed the user registration. In each record of the artificial intelligence management database 221, the user identification information of the corresponding user and an artificial intelligence module M of the corresponding user are associated and stored.

Thus, the control server 3 manages the respective artificial intelligence modules M of the users who have completed the user registration in the route search service, by use of the artificial intelligence management database 221.

Note that the control server 3 does not have to necessarily store the artificial intelligence management database 221. The external device other than the control server 3 (e.g., a server other than the control server 3) may store the artificial intelligence management database 221, and the control server 3 may suitably access the external device to utilize the artificial intelligence management database 221.

Next, description will be made as to the artificial intelligence module M stored in the artificial intelligence management database 221.

The artificial intelligence module M of one user is a module having a function of generating an emotion of the same quality as in the emotion of the one user and outputting information in which the emotion of the same quality as in the emotion of the one user is reflected, in response to an input of information. As described later, the artificial intelligence module M of the one user is suitably modified to generate the emotion of the one user by the artificial intelligence module modification unit 202. Note that the emotion of the same quality mentioned here means the emotion that is substantially equal to the emotion of the user. That is, there is meant the artificial intelligence that can generate the same emotion as an emotion that is held by the user to a certain event.

Next, description will be made as to the artificial intelligence module modification unit 202 of the control server 3.

The artificial intelligence module modification unit 202 suitably modifies the artificial intelligence module M by use of an artificial intelligence technology so that the emotion of the same quality as in the emotion of the one user is generated in the artificial intelligence module M of the one user. Hereinafter, processing of the artificial intelligence module modification unit 202 will be described in detail.

Examples of the artificial intelligence technology include a technology concerning various filtering, a technology concerning an independent component analysis, a technology concerning a support vector machine (SVM), contour extraction and another image processing technology, a technology concerning pattern recognition (e.g., voice recognition or face recognition), a technology concerning natural language processing, a technology concerning knowledge information processing, a technology concerning reinforcement learning, a technology concerning Bayesian network, a technology concerning a self-organizing map (SOM), a technology concerning a neural network, and a technology concerning deep learning.

Figure 4:
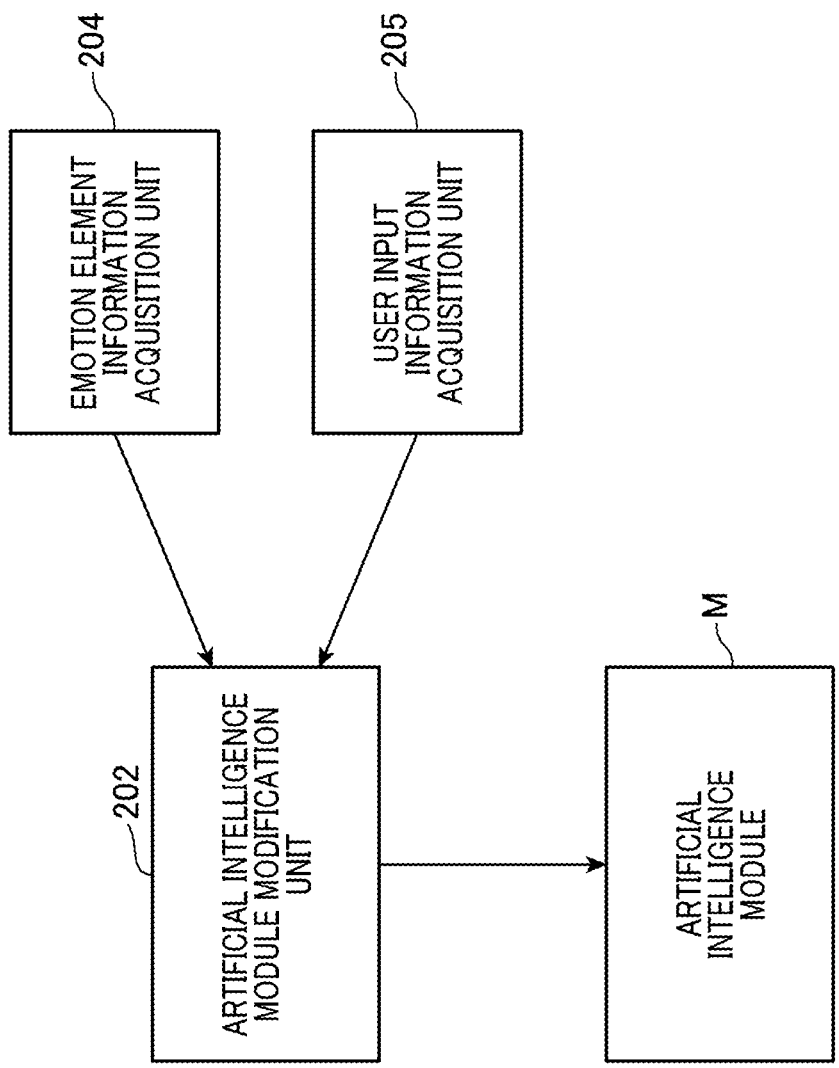
FIG. 4 is a diagram for use in explanation of an artificial intelligence module modification unit.

FIG. 4 is a diagram for use in explanation of the artificial intelligence module modification unit 202.

As to the modification of the artificial intelligence module M of one user, the emotion element information acquisition unit 204 suitably acquires emotion element information on the one user, and outputs the information to the artificial intelligence module modification unit 202. That is, the emotion element information on the one user is suitably input into the artificial intelligence module modification unit 202. The emotion element information is information that is input from sensors, devices and the like, and is usable information in generating the emotion of the same quality as in the user's emotion in the artificial intelligence module M. In particular, the emotion element information includes information based on user's daily activity as illustrated below.

For example, the emotion element information is user's biological information. The biological information is information indicative of changes or the like of user's heart rate, blood pressure, breathing rate, sweat amount, body temperature, voice print, brain waves, and eyeballs (pupils). For example, a function of detecting the biological information is mounted in a watch type wearable terminal worn by the user, a camera built in the wearable terminal or the mobile terminal detects user's biological information, and transmits the detected biological information to the control server 3.

Furthermore, for example, the emotion element information is captured image information generated by imaging user's face. For example, a camera provided in an entrance of a house where the user resides, or the like generates the captured image information, and transmits the generated captured image information to the control server 3. Additionally, for example, in a case where the user owns a vehicle (a motorcycle, an automobile or the like), a camera provided at a position of the vehicle at which the user's face can be imaged transmits the captured image information to the control server 3.

In addition, for example, the emotion element information is voice information in which user's speech is recorded. For example, a sound acquisition device provided at a predetermined position of the house where the user resides and having a microphone generates voice information, and transmits the generated voice information to the control server 3. Furthermore, for example, in a case where the user owns the motorcycle, a headset provided on a helmet worn by the user generates the voice information, and transmits the generated voice information to the control server 3.

Additionally, for example, the emotion element information is information indicative of a use mode of the vehicle (the motorcycle, a motorbike, or the like) owned by the user. For example, an in-vehicle device provided in the vehicle detects the use mode of the vehicle by the user from various sensors provided in the vehicle, and transmits information indicative of the use mode to the control server 3.

Furthermore, for example, the emotion element information is information indicative of a use mode of a house appliance (a television set, a refrigerator, a rice cooker, a vacuum cleaner or the like) owned by the user. For example, the house appliance detects the use mode of the house appliance by the user from various sensors provided in the house appliances, and transmits information indicative of the use mode to the control server 3.

Additionally, for example, the emotion element information is position information indicative of user's position. For example, the mobile terminal (the smartphone or the like) carried by the user or the in-vehicle device of the vehicle in which the user is present detects the user's position on the basis of an input from a GPS unit or the like, and transmits the position information to the control server 3.

In addition, for example, the emotion element information is environment information indicative of an environment around the user. Examples of the environment include an outside temperature, humidity, weather, time zone (morning, afternoon, evening or the like), and season. For example, the mobile terminal carried by the user or the wearable terminal worn by the user detects the environment around the user on the basis of information obtained by accessing various sensors or a predetermined server, and transmits the environment information to the control server 3.

The above described emotion element information is only an example. As the emotion element information, the information detected by various sensors or various devices can be used.

The artificial intelligence module modification unit 202 suitably modifies the artificial intelligence module M so that the emotion of the same quality as in the emotion of the one user is generated in the artificial intelligence module M, by the artificial intelligence technology on the basis of the emotion element information of the one user.

For example, the artificial intelligence module modification unit 202 recognizes an environment where the user holds the emotion, and a kind of the held emotion, on the basis of the environment information, the position information, the biological information, the captured image information, the voice information and the like, and on the basis of the recognition, the unit modifies the artificial intelligence module M so that the emotion of the same quality as in the user's emotion is generated in the artificial intelligence module M. Furthermore, for example, the artificial intelligence module modification unit 202 recognizes a use mode in which the user prefers or does not prefer to use a thing such as the vehicle or the house appliance on the basis of the information indicative of the use mode of the vehicle or the information indicative of the use mode of the house appliance, and on the basis of the recognition, the unit modifies the artificial intelligence module M so that the emotion of the same quality as in the user's emotion is generated in the artificial intelligence module M.

Note that the user identification information is added to the emotion element information input into the artificial intelligence module modification unit 202, and the artificial intelligence module modification unit 202 specifies the artificial intelligence module M to be modified on the basis of the user identification information added to the information, and modifies the specified artificial intelligence module M, when modifying the artificial intelligence module M on the basis of the emotion element information.

Furthermore, as to the modification of the artificial intelligence module M of the one user, the user input information acquisition unit 205 suitably acquires the emotion element information on the one user, and outputs the information to the artificial intelligence module modification unit 202. That is, user input information on the one user is suitably input into the artificial intelligence module modification unit 202. The user input information is information to be input by the user, and is usable information in generating the emotion of the same quality as in the user's emotion in the artificial intelligence module M.

For example, a questionnaire to analyze user's personality is notified from the service provider to the user in advance. Then, user's answer to the questionnaire (information to be input by the user to the questionnaire) corresponds to the user input information. The user input information is not limited to the answer to the questionnaire, and may be any information that can be used in generating the emotion of the same quality as in the user's emotion in the artificial intelligence module M and that is input by the user on purpose.

The artificial intelligence module modification unit 202 analyzes the user's personality by using the artificial intelligence technology, for example, by applying a statistical approach on the basis of the user input information. The user's personality is, for example, user's emotion tendency indicating an environment where the user holds the emotion and a kind of the emotion held by the user. Alternatively, the user's personality is user's activity tendency indicative of a circumstance where the user takes an activity and a kind of the activity to be taken. The artificial intelligence module modification unit 202 modifies the artificial intelligence module M so that the emotion of the same quality as in the user's emotion is generated in the artificial intelligence module M, on the basis of the analyzed user's personality.

Note that the user identification information is added to the user input information input into the artificial intelligence module modification unit 202, and when modifying the artificial intelligence module M on the basis of the user input information, the artificial intelligence module modification unit 202 specifies the artificial intelligence module M to be modified, on the basis of the user identification information added to the information, and modifies the specified artificial intelligence module M.

The modification of the artificial intelligence module M by the artificial intelligence module modification unit 202 has been described above, but the processing of the artificial intelligence module modification unit 202 illustrated in the above description is only an example. During the modification of the artificial intelligence module M, the artificial intelligence module modification unit 202 can execute various processing by use of the artificial intelligence technology and the other technology, and during the execution of the processing, various pieces of information other than the illustrated information can be utilized. Alternatively, the artificial intelligence module modification unit 202 may modify the artificial intelligence module M by use of a combination of the emotion element information and the user input information.

Next, description will be made as to operations of the terminal 2 and the control server 3 in a case where the user utilizes the route search service provided by the control server 3.

Figure 5:
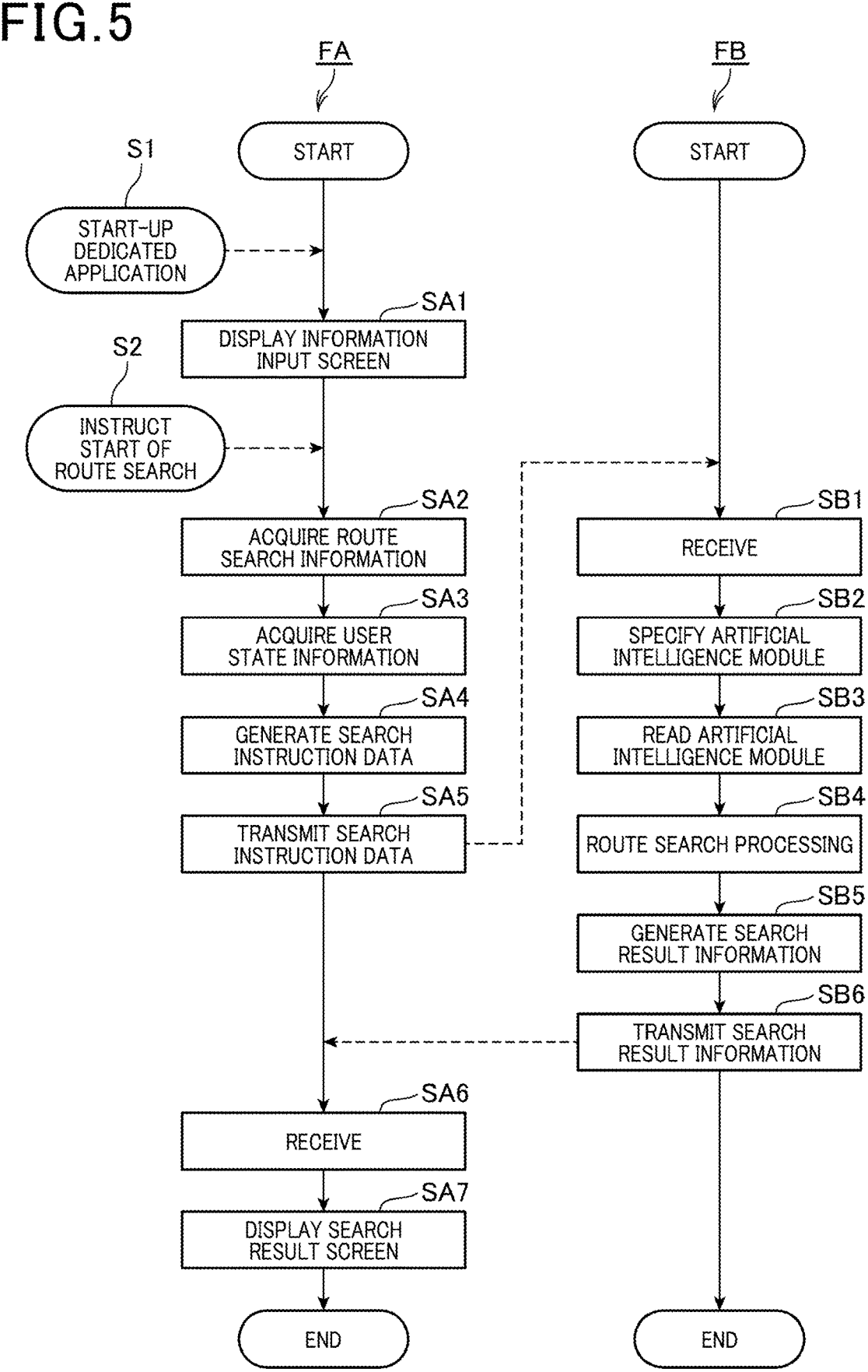
FIG. 5 is a flowchart showing operations of the terminal and the control server.

A flowchart FA of FIG. 5 is a flowchart showing the operation of the terminal 2, and a flowchart FB of FIG. 5 is a flowchart showing the operation of the control server 3.

As shown in the flowchart FA of FIG. 5, when utilizing the route search service, the user performs a touch operation of the touch panel 12 of the terminal 2, and starts up a dedicated application AP (step S1).

Note that the terminal control unit 10 executes each processing of the flowchart FA by a function of the dedicated application AP started up by the user in the step S1.

As shown in the flowchart FA of FIG. 5, the terminal control unit 10 of the terminal 2 controls the touch panel 12 to display an information input screen G1 in response to the startup of the dedicated application AP (step SA1).

Figure 6:
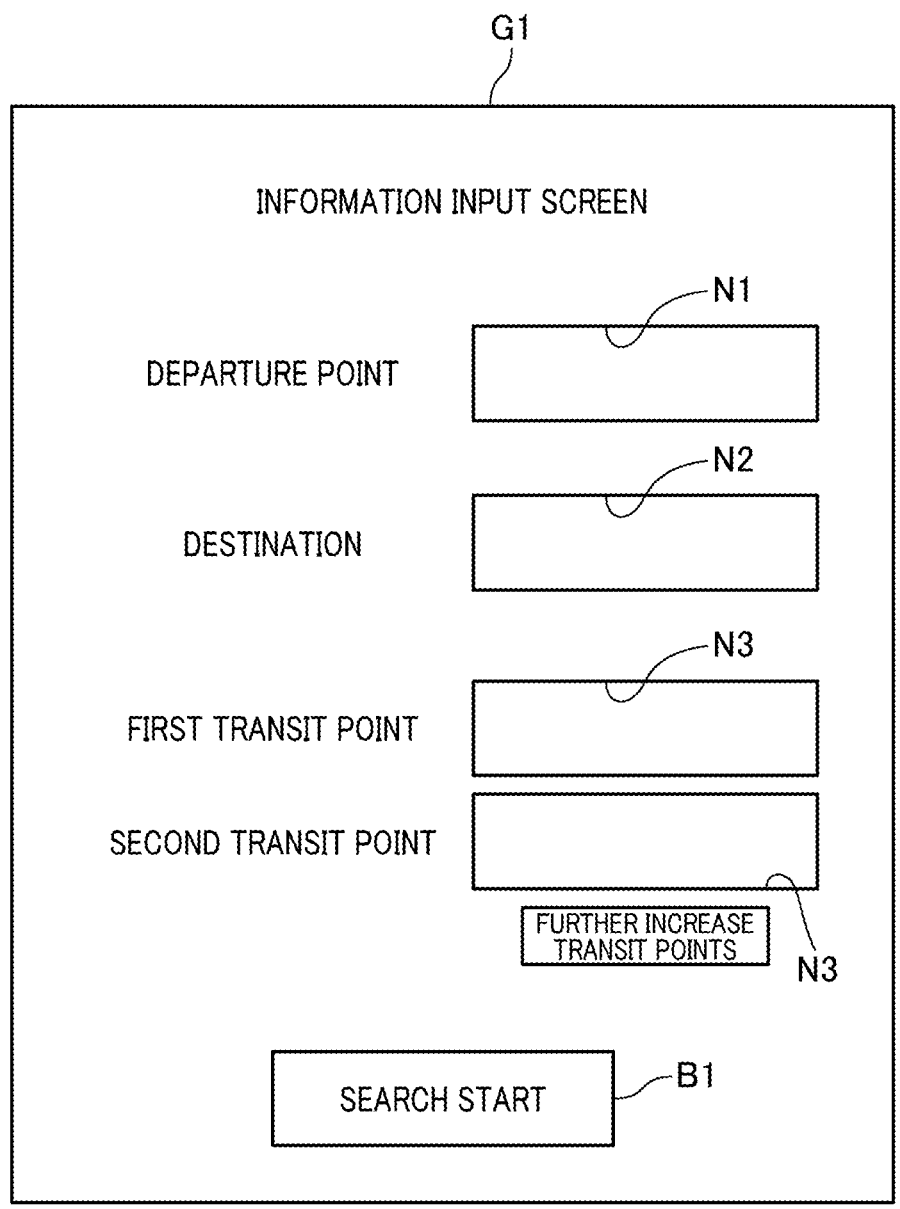
FIG. 6 is a diagram showing an information input screen.

FIG. 6 is a diagram showing the information input screen G1.

As shown in FIG. 6, the information input screen G1 has a departure point input field N1. The departure point input field N1 is a field where information indicative of the departure point (hereinafter referred to as "departure point information") is input. When the touch operation of the departure point input field N1 is performed by the user, the screen is changed so that a screen to input the departure point information (hereinafter referred to as "departure point input screen") is displayed. The user inputs and determines the information indicative of the departure point, for example, by directly inputting the departure point information into the departure point input screen, or selecting the information from departure point information prepared beforehand. In the present embodiment, the user can specify, as the departure point, a specific facility, in addition to a train station, a bus stop, an airplane airport, a ship moorage or the like. Examples of the specific facility include user's house, user's workplace, an event venue, and a store. The user can register the specific facility in advance, and can input the departure point information by selecting one facility from the registered facilities in the departure point input screen.

When the input of the departure point information is determined in the departure point input screen, the screen changes to the information input screen G1. In the departure point input field N1 of the information input screen G1, the determined input departure point information is displayed.

As shown in FIG. 6, the information input screen G1 has a destination input field N2. The destination input field N2 is a field where information indicative of the destination (hereinafter referred to as "destination information") is input. When the touch operation of the destination input field N2 is performed by the user, the screen is changed so that a screen to input the destination information (hereinafter referred to as "destination input screen") is displayed. In the destination input screen, the user can input and determine the destination information by the same method as in the above described departure point input screen. The user can specify the specific facility as the destination in the same manner as in the departure point.

When the input of the destination information is determined in the destination input screen, the screen changes to the information input screen G1. In the destination input field N2 of the information input screen G1, the determined input destination information is displayed.

As shown in FIG. 6, the information input screen G1 has a transit point input field N3. The transit point input field N3 is a field to input information indicative of one or more transit points through which the user wants to go before reaching the destination (hereinafter referred to as "transit point information"). When the touch operation of the transit point input field N3 is performed by the user, the screen is changed to display a screen into which the transit point information is input (hereinafter referred to as "transit point input screen"). In the transit point input screen, the user can input and determine the transit point information by the same method as in the above described departure point input screen. The user can specify a specific facility as the transit point in the same manner as in the departure point.

When the input of the transit point information is determined in the transit point input screen, the screen is changed to the information input screen G1. In the transit point input field N3 of the information input screen G1, the determined input transit point information is displayed. In the present embodiment, when the user wants to go through a plurality of transit points before reaching the destination, the user can input a plurality of pieces of transit point information in the information input screen G1.

Thus, in the present embodiment, the user can select not only a specified place such as a station of public transport but also an arbitrary point as the destination, the departure point or the transit point.

As shown in FIG. 6, the information input screen G1 has a search start button B1. The search start button B1 is a button that determines the input of the information to the information input screen G1, and instructs start of route search.

Note that the information input in the information input screen G1 is for use when the control server 3 performs the route search as described later. In the present embodiment, the information to be input into the information input screen G1 is the departure point information, the destination information and the transit point information, but another information may be input into the information input screen G1 and used by the control server 3 during the route search. For example, in the information input screen G1, there can be input information indicative of scheduled date and time to depart from the departure point, information indicative of scheduled date and time to arrive at the destination, information indicative of scheduled date and time to arrive at the transit point, information indicative of scheduled date and time to depart from the transit point, and information indicative of search conditions (e.g., prohibition of use of a bus, etc.).

After inputting each piece of information into the information input screen G1, the user performs a touch operation of the search start button B1, thereby instructing the start of the route search (step S2).

Upon detecting that the user has operated the search start button B1 of the information input screen G1, the terminal control unit 10 acquires the destination information, the departure point information and the transit point information that are input in the screen (step SA2). When the transit point information is not input by the user, a value of the transit point information is a null value.

In the following description, a combination of the destination information, the departure point information and the transit point information will be referred to as "route search information". The route search information is information to be input by the user during the route search.

Next, the terminal control unit 10 acquires user state information (step SA3). Hereinafter, processing of the step SA3 will be described in detail.

The user state information is information on user's state as of this moment. The user's state means user's state that is concerned with a route to the destination and that influences a route desired by the user (the route suited for the user).

An example of the user's state is user's physical condition. It is assumed that the route desired to be utilized as the route until the user reaches the destination varies with the user's physical condition. For example, it is assumed that when the user's physical condition is poor, the user desires a route along which a physical burden is light. On the other hand, it is assumed that when the user's physical condition is not poor, the user does not attach any importance to the physical burden concerning the route. The terminal control unit 10 acquires the user state information on the user's physical condition, for example, by the following method. For example, the user wears the wearable terminal having a function of acquiring biological information such as the user's heart rate, blood pressure, breathing rate, sweat amount, and body temperature. The biological information is information having a value that changes with the user's physical condition, and can be used when the user's physical condition is presumed. Then, the terminal control unit 10 communicates with the wearable terminal to acquire the biological information, thereby acquiring the user state information on the user's physical condition. Alternatively, for example, the terminal control unit 10 displays a predetermined user interface in the touch panel 12 so that the user inputs information on the physical condition, and the unit acquires the user state information on the user's physical condition on the basis of the input information. Alternatively, for example, the terminal control unit 10 acquires the captured image information as the user state information on the user's physical condition from imaging means that can image user's face as of this moment. Since a state (complexion or the like) of the user's face changes with the user's physical condition, the captured image information can be used when the user's physical condition is presumed.

Furthermore, for example, the user's state is an amount of user's baggage. It is assumed that the route desired to be utilized as the route until the user reaches the destination changes with the amount of the user's baggage. For example, it is assumed that when the amount of the user's baggage is large, the user prefers a route having a short walking distance, and when the amount of the user's baggage is not large, the user does not attach any importance to the walking distance concerning the route. The terminal control unit 10 acquires the user state information on the amount of the user's baggage, for example, by the following method. For example, the terminal control unit 10 displays the predetermined user interface in the touch panel 12 so that the user inputs the information on the amount of the user's baggage, and the unit acquires the user state information on the amount of the user's baggage on the basis of the input information.

Additionally, for example, the user's state is user's garment. The user's garment includes shoes that the user wears (sports shoes, leather shoes, high-heeled shoes or the like) in addition to clothes that the user wears. It is assumed that the route desired to be utilized as the route until the user reaches the destination changes with the user's garment. For example, it is assumed that when the user's garment is undesirable due to dirt or disorder on the garment, the user does not prefer a route along which outdoor staying time is long, and that when the user does not have to worry about the dirt or disorder on the user's garment, the user does not attach any importance to the outdoor staying time concerning the route. Alternatively, for example, it is assumed that when the user wears shoes that are difficult to move (e.g., the high-heeled shoes), the user prefers a route having a shorter walking distance, and that when the user wears shoes that are easy to move (e.g., the sports shoes), the user does not attach any importance to the walking distance concerning the route. The terminal control unit 10 acquires the user state information on the user's garment, for example, by the following method. For example, the terminal control unit 10 displays the predetermined user interface in the touch panel 12 so that the user inputs the information on the user's garment, and the unit acquires the user state information on the user's garment on the basis of the input information. Alternatively, for example, the terminal control unit 10 acquires the captured image information from imaging means that can image user's body as of this moment, analyzes the acquired captured image information, and acquires the user state information on the user's garment.

Furthermore, for example, the user's state is user's appearance. Examples of the user's appearance include presence/absence of use of hair dressing, a cosmetic condition, presence/absence of wearing of glasses, and presence/absence of wearing of accessories. It is assumed that the route desired to be utilized as the route until the user reaches the destination changes with the user's appearance. For example, it is assumed that when the user wears the hair dressing, the user does not want to use a two-wheeled vehicle for which wearing a helmet is essential. The terminal control unit 10 acquires the user state information on the user's appearance, for example, by the following method. For example, the terminal control unit 10 displays the predetermined user interface in the touch panel 12 so that the user inputs the information on the user's appearance, and the user acquires the user state information on the user's appearance on the basis of the input information. Alternatively, for example, the terminal control unit 10 acquires the captured image information from the imaging means that can image the user's body as of this moment, analyzes the acquired captured image information, and acquires the user state information on the user's appearance.

The examples of the user state information have been described above, but the user state information is not limited to the illustrated information. That is, the user state information may be any information on the user's state that influences the route that the user desires.

Next, the terminal control unit 10 generates search instruction data (step SA4). The search instruction data is control data including the route search information acquired in the step SA2 (the destination information, the departure point information and the transit point information), the user state information acquired in the step SA3, and the user identification information, and the data is used to instruct execution of the route search based on these pieces of information. The user identification information is registered in the dedicated application AP.

Subsequently, the terminal control unit 10 controls the terminal communication unit 11 and transmits the search instruction data generated in the step SA4 to the control server 3 (step SA5). Information on communication required to transmit the search instruction data to the control server 3 (an address of the control server 3, the communication protocol for use in the communication, etc.) is registered in advance. In the step SA5, for example, the terminal control unit 10 transmits the search instruction data as an HTTP request to the control server 3 in accordance with an HTTP.

As shown in the flowchart FB of FIG. 5, the search unit 201 of the server control unit 20 of the control server 3 controls the server communication unit 21 to receive the search instruction data (step SB1).

Subsequently, the search unit 201 refers to the artificial intelligence management database 221, and in the database, the unit specifies the artificial intelligence module M that is associated with the user identification information having the same value as a value of the user identification information included in the search instruction data received in the step SB1 (step SB2). The artificial intelligence module M specified in the step SB2 is artificial intelligence module M that is associated with the user who instructs the route search, and the emotion of the same quality as in the user's emotion is generated.

Subsequently, the search unit 201 reads (loads) the artificial intelligence module M specified in the step SB2, and places the processing by a function of the artificial intelligence module M in an executable state (step SB3).

The artificial intelligence module execution unit 203 provided in the server control unit 20 is a function block that executes the processing by the function of the artificial intelligence module M read in the step SB3.

Subsequently, the search unit 201 executes route search processing by use of the route database 222 stored in the server storage unit 22 (step SB4). Hereinafter, description will be made in detail as to the route search processing of the step SB4.

Note that the route database 222 is a database that stores the information on the route which is required for executing the route search. The route database 222 has information on nodes corresponding to connection points including a point that is settable as the departure point, the destination or the transit point, the station of a traffic network of the train, the stop of a traffic network of the bus, and the like, information on a link formed between the nodes, and the like. Note that in the present embodiment, the route database 222 is configured to be stored in the control server 3, but the database may be configured to be stored in an external device that is communicable with the control server 3.

In the following description, a route from the departure point to the destination is expressed as "destination route", a section between one point that is present on the destination route and the other point is expressed as "section", and a route that reaches from the one point to the other point is expressed as "section route".

In the route search processing of the step SB4, the search unit 201 searches for the destination route on the basis of the route database 222. In this case, the search unit 201 reflects the user's emotion and sets a priority of each section route, when there are a plurality of candidates for the section route in the section between one point and the other point. When the result of the route search is presented to the user, it is recommended to utilize the section route having a higher priority in a higher priority order, and when the result of the route search is presented to the user, it is recommended to utilize the section route having a lower priority in a lower priority order. Hereinafter, description will be made as to an example of processing of the search unit 201, when setting the priority to each section route in a case where there are a plurality of candidates for the section route in the section from one point to the other point.

First Example

Figure 7:
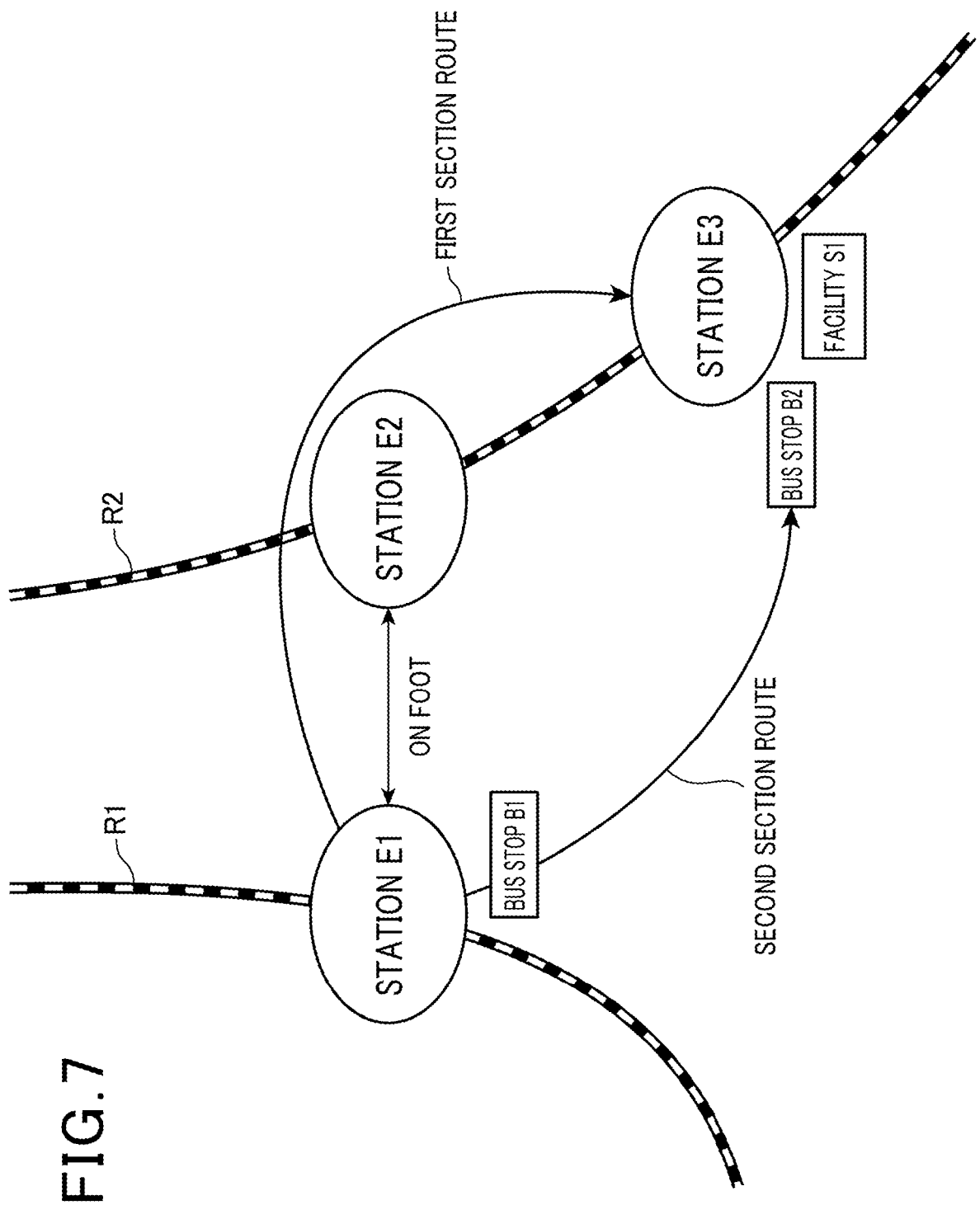
FIG. 7 is a diagram for use in explanation of setting of a priority of a section route.

FIG. 7 is a diagram for use in explanation of the first example.

In the first example, a station E1 is present along a route R1 concerned with a train, and a station E2 and a station E3 are present along a route R2 different from the route R1. It is assumed to move on foot between the station E1 and the station E2, and time of about 10 minutes is required when a user moves on foot from the station E1 to the station E2. In the vicinity of the station E3, a facility S1 set as a destination by the user is present. A separation distance between the station E3 and the facility S1 is short to such an extent that the time required for moving between these facilities can be ignored. Furthermore, a bus stop B1 is present in the vicinity of the station E1, and a bus stop B2 is present in the vicinity of the facility S1. Each of a separation distance between the station E1 and the bus stop B1 and a separation distance between the bus stop B2 and the facility S1 is short to such an extent that time required for moving between the facilities can be ignored (the time is assumed to be within about 3 minutes).

In the first example, two candidates for the section route are present in a section where the user uses the route R1 to reach the station E1 and then reaches from the station E1 to the facility S1. That is, as the candidate for the section route, there is a first section route along which the user moves on foot from the station E1 to the station E2, moves by train from the station E2 via the route R2 to the station E3, and gets off the train at the station E3 to move to the facility S1. Furthermore, as the candidate for the section route, there is a second section route along which the user moves from the station E1 to the bus stop B1, moves by bus from the bus stop B1 to the bus stop B2, and gets off the bus at the bus stop B2 to move to the facility S1. In the present example, time required for the use of the first section route to go from the station E1 to the facility S1 is sufficiently shorter than time required for the use of the second section route to go from the station E1 to the facility S1.

Figure 8:
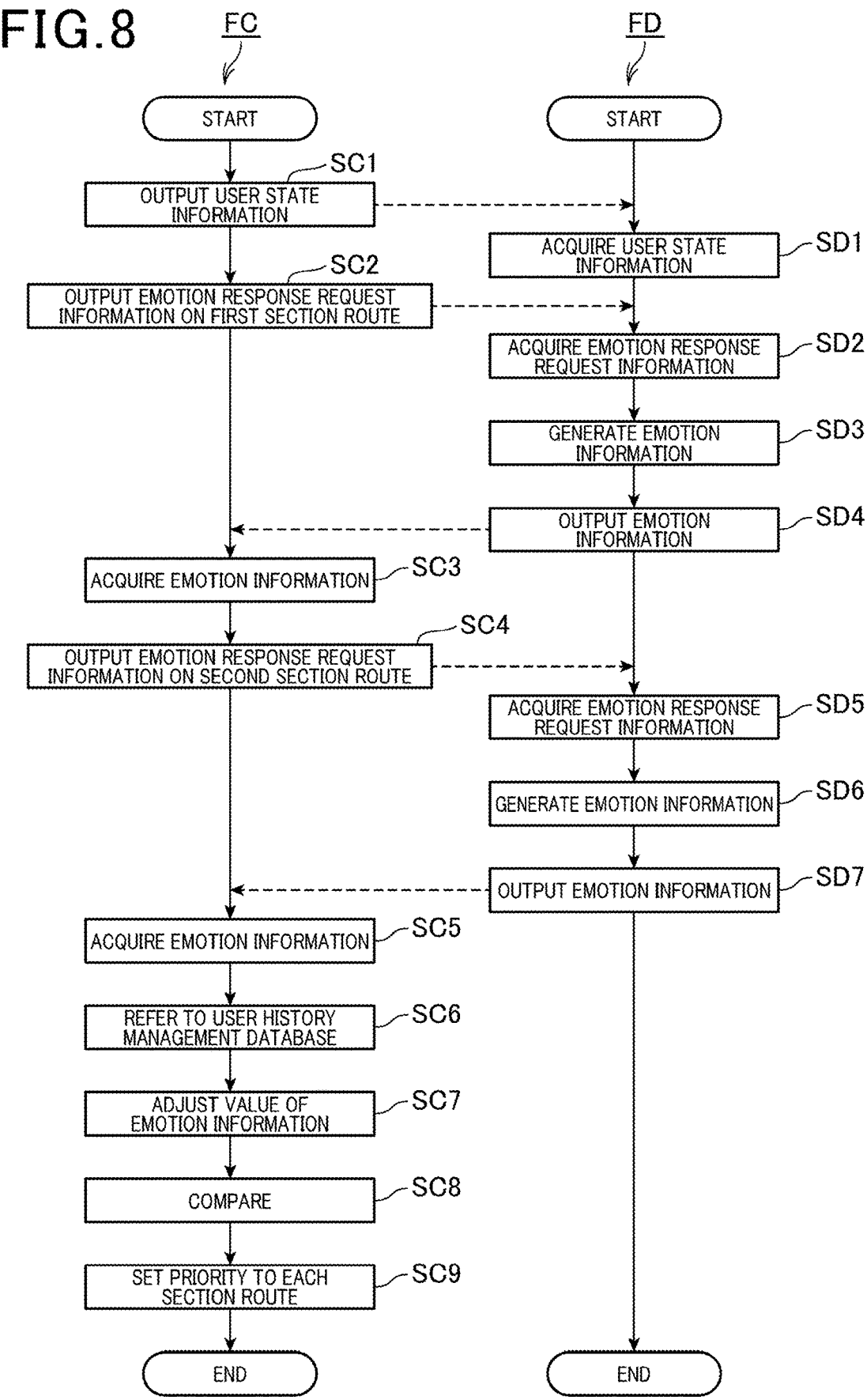
FIG. 8 is a flowchart showing operations of a search unit and an artificial intelligence module execution unit.

FIG. 8 is a flowchart showing processing of the search unit 201 and the artificial intelligence module execution unit 203 when priorities are set to the first section route and the second section route in the first example. A flowchart FC of FIG. 8 shows an operation of the search unit 201, and a flowchart FD of FIG. 8 shows an operation of the artificial intelligence module execution unit 203.

As shown in the flowchart FC of FIG. 8, in the first example, the search unit 201 outputs, to the artificial intelligence module execution unit 203, the user state information included in the search instruction data received in the step SB1 (step SC1). As shown in the flowchart FD, the artificial intelligence module execution unit 203 acquires the input user state information (step SD1).

As shown in the flowchart FC of FIG. 8, the search unit 201 outputs emotion response request information on the first section route to the artificial intelligence module execution unit 203 (step SC2). As shown in the flowchart FD, the artificial intelligence module execution unit 203 acquires the emotion response request information on the first section route which is input (step SD2).

Here, the emotion response request information on one section route includes at least route specifying information that specifies the one section route, and environment information on an environment of the one section route.

The route specifying information that specifies the one section route includes information that specifies each point through which the user goes in the one section route, information indicative of transportation (including walking) to be utilized for the user to move between the respective points, and information indicative of time required for the user to move between the respective points. For example, the route specifying information that specifies the first section route includes information that specifies the station E1, the station E2, the station E3 and the facility S1, information indicative of the transportation to be utilized by the user in moving between the respective points (e.g., information indicating that the transportation between the station E1 and the station E2 is the walking), and information indicative of time required for the user to move between the respective points (e.g., information indicating that time of 10 minutes is required for moving between the station E1 and the station E2).

Furthermore, the environment information on the environment of the one section route is information indicative of weather of a region including the one section route, the outside temperature, the humidity, the time zone, the season and the like. The search unit 201 controls the server communication unit 21 to communicate with an external device that provides the environment information, to output, to the external device, necessary information such as information that specifies the region including the section route, and to acquire the environment information as a response from the external device.

As shown in the flowchart FD of FIG. 8, the artificial intelligence module execution unit 203 into which the emotion response request information on the first section route is input reflects the user's emotion and generates emotion information on the basis of the emotion response request information (step SD3). The emotion information on one section route is information that reflects an emotion held by the user when the one section route is recognized and that indicates, as a numeric value, a degree of validity for the user to utilize the one section route. In the present embodiment, the emotion information has a value in a range of a value "0" indicative of the lowest validity to a value "100" indicative of the highest validity.

During generation of the emotion information in the step SD3, the artificial intelligence module execution unit 203 reflects the user's state as of this moment which is indicated by the user state information acquired in the step SD1, and the environment indicated by the environment information included in the emotion response request information acquired in the step SD2; and generates the emotion of the same quality as in the user's emotion held to the section route specified by the route specifying information included in the emotion response request information. Then, the better emotion the user holds for the section route, the higher value the value of the emotion information is, and the worse emotion the user holds for the section route, the lower value the value of the emotion information is.

For example, it is assumed that, when the user wears high-heeled shoes, the user holds an emotion that the user does not want to move on foot as much as possible. In this case, the artificial intelligence module execution unit 203 generates the emotion of the same quality as in the user's emotion that the user does not want to move on foot as much as possible in a state where the user wears the high-heeled shoes. Furthermore, in the state where the user wears the high-heeled shoes, the artificial intelligence module execution unit 203 compares one section route including walking as transportation with another section route that does not include the walking, and sets a lower value to the emotion information concerned with the one section route.

Furthermore, for example, it is assumed that, if the weather is fine and the outside temperature is "30° C." or more, the user holds the emotion that the user does not want to move on foot as much as possible. In this case, the artificial intelligence module execution unit 203 generates the emotion of the same quality as in the user's emotion that the user does not want to move on foot as much as possible, if the weather is fine and the outside temperature is "30° C." or more. Then, in the case where the weather is fine and the outside temperature is "30° C." or more, the artificial intelligence module execution unit 203 compares one section route including walking as transportation with another section route that does not include the walking, and sets a lower value to the emotion information concerned with the one section route.

Additionally, for example, it is assumed that, when an amount of baggage is large, the user holds an emotion that the user wants to avoid moving on foot as much as possible. In this case, the artificial intelligence module execution unit 203 generates the emotion of the same quality as in the user's emotion that the user wants to avoid the moving on foot in long distance as much as possible, if the amount of the user's baggage is large. Then, in the case where the amount of the user's baggage is large, the artificial intelligence module execution unit 203 compares one section route along which time of the movement on foot as transportation is long with another section route along which the time is short, and the unit sets a low value to a route along which the time for the movement on foot is long, about the emotion information concerned with the one section route.

The artificial intelligence module execution unit 203 judge various elements that influence the user's emotion, in multifaceted and comprehensive manners, to set the value of the environment information.

The example of a method by which the artificial intelligence module execution unit 203 generates the emotion information has been described above. However, the method by which the artificial intelligence module execution unit 203 generates the emotion information is not limited to the illustrated example. That is, the emotion information may be generated by reflecting the user's emotion on the basis of the state of the user as of this moment and the environment of the section route.

Subsequently, the artificial intelligence module execution unit 203 outputs, to the search unit 201, the emotion information on the first section route generated in the step SD3 (step SD4).

As shown in the flowchart FC of FIG. 8, the search unit 201 acquires the emotion information on the first section route which is input (step SC3).

Subsequently, the search unit 201 outputs, to the artificial intelligence module execution unit 203, emotion response request information on the second section route (step SC4). As shown in the flowchart FD, the artificial intelligence module execution unit 203 acquires the emotion response request information on the second section route which is input (step SD5). The emotion response request information on the second section route includes at least route specifying information that specifies the second section route and environment information on an environment of the second section route.

As shown in the flowchart FD of FIG. 8, the artificial intelligence module execution unit 203 into which the emotion response request information on the second section route is input reflects the user's emotion and generates the emotion information on the basis of the emotion response request information (step SD6).

Subsequently, the artificial intelligence module execution unit 203 outputs, to the search unit 201, the emotion information on the second section route which is generated in the step SD6 (step SD7).

As shown in the flowchart FC of FIG. 8, the search unit 201 acquires the emotion information on the second section route which is input (step SC5).

Subsequently, the search unit 201 refers to the user history management database 223 (step SC6).

The user history management database 223 stores selection information for each user. The selection information is information that cumulatively has information indicative of the section route selected by the user, in a case where the user has selected one section route from a plurality of candidates for the section route of a predetermined section in the past.

After referring to the user history management database 223 in the step SC6, the search unit 201 acquires the selection information of the user who instructs the route search, and executes the following processing on the basis of the acquired selection information (step SC7). That is, the search unit 201 judges, on the basis of the selection information, whether or not the user has selected one section route from the candidates for the section route in the past, as to the section according to the first example. When it is judged that the user has selected the one section route, the search unit 201 reflects the selection performed by the user in the past, and adjusts respective values of the emotion information on the first section route which is acquired in the step SC3 and the emotion information on the second section route which is acquired in the step SC5. Specifically, the search unit 201 multiplies each of both the emotion information on the first section route and the emotion information on the second section route by a coefficient adjusted so that the value of the emotion information becomes larger in the section route that has been selected more times in the past.

By the processing of the step SC7, in each of the value of the emotion information on the first section route and the value of the emotion information on the second section route, the selection of the section route is reflected which has been performed by the user in the corresponding section in the past.

Subsequently, the search unit 201 compares a magnitude of the value of the emotion information on the first section route with a magnitude of the value of the emotion information on the second section route (step SC8).

Subsequently, the search unit 201 sets a higher priority to the section route having a larger value of the emotion information, and sets a lower priority to the section route having a smaller value of the emotion information, in a relation between the first section route and the second section route (step SC9).

As described above, when there are a plurality of candidates for the section route for one section, the search unit 201 reflects the user's state as of this moment, the user's emotion based on the environment of each section route, and the selection of the one section which has been performed by the user in the past, and sets the priority to each of the candidates for the section route.

Note that in the above description, the search unit 201 multiplies each of both the emotion information on the first section route and the emotion information on the second section route by the coefficient adjusted so that the value of the emotion information becomes larger in the section route that has been selected more times in the past, thereby adjusting the value of the emotion information. In this regard, the search unit 201 may be configured to adjust the coefficient so that the value of the emotion information becomes larger in the section route that has been selected more times in the past, in an environment that is the same as or close to the environment of the current section route.

Consequently, for example, in a case where the user has selected the section route along which the bus is used as the transportation more often than the section route along which the walking is used as the transportation on rainy days in the past, the bus is selected with a higher priority rather than the walking in a situation where it rains when the search is instructed.

Second Example

Figure 9:
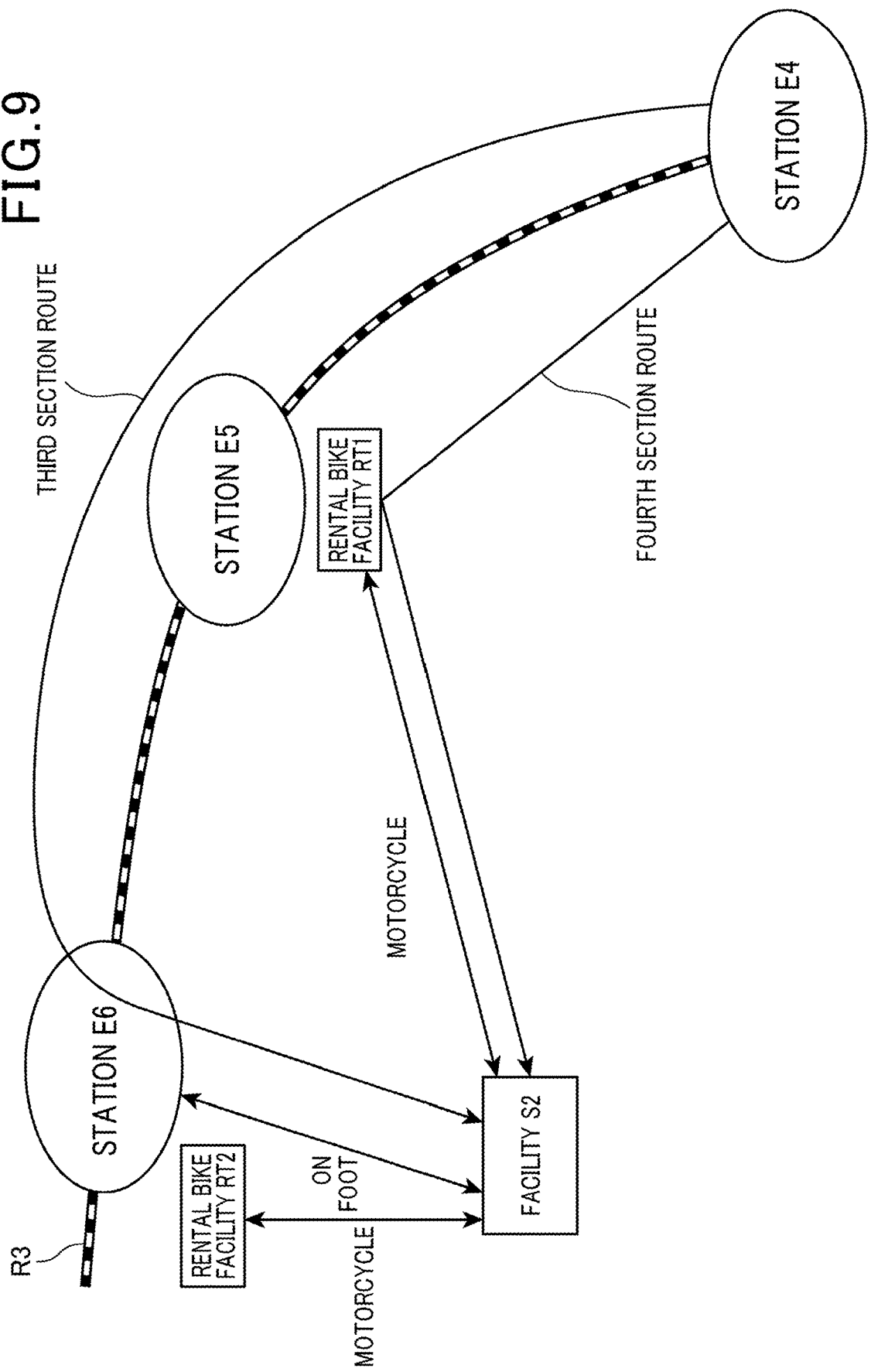
FIG. 9 is a diagram for use in explanation of setting of a priority of a section route.

FIG. 9 is a diagram for use in explanation of a second example.

In the second example, a station E4, a station E5 and a station E6 are present along a route R3 concerned with a train. At a position corresponding to the station E6, a facility S2 set as a destination by a user is present. When the user moves on foot from the station E6 to the facility S2, time of about 10 minutes is required. A rental bike facility RT1 is present in the vicinity of the station E5 and a rental bike facility RT2 is present in the vicinity of the station E6. The rental bike facility RT1 and the rental bike facility RT2 are facilities operated by a predetermined company. In the rental bike facility RT1 and the rental bike facility RT2, motorcycles that can be rented to the user are prepared. In each facility, the user can rent the prepared motorcycle, and the user can return the motorcycle. In the rental bike facility RT2, the user can return the motorcycle rented in the rental bike facility RT1. Conversely, in the rental bike facility RT1, the user can return the motorcycle rented in the rental bike facility RT2.

In the second example, the following section is present. That is, a section between the station E4 as a start point and the facility S2 as a destination is present. Furthermore, in the second example, two candidates for the section route are present in the section. That is, as the candidate for the section route, there is a third section route along which the user moves by train from the station E4 via the route R3 to the station E5, further moves by train from the station E5 via the route R3 to the station E6, and moves on foot from the station E6 to the facility S2 of the destination. When utilizing the third section route, the user completes stay in the facility S2 and then moves on foot to the station E6. Alternatively, as another candidate for the section route, there is a fourth section route along which the user moves by train from the station E4 via the route R3 to the station E5, gets off the train at the station E5 to move to the rental bike facility RT1, rents the motorcycle in the rental bike facility RT1, and moves on the rented motorcycle from the rental bike facility RT1 to the facility S2 of the destination. When utilizing the fourth section route, the user completes the stay in the facility S2, and then the user moves to the rental bike facility RT2 (that may be the rental bike facility RT1) by use of the motorcycle.

Note that the control server 3 stores a database in which in association with user identification information, there are associated information indicating whether or not the user has a license to drive the motorcycle and information indicating whether or not the user is qualified to utilize the rental bike facilities RT1 and RT2. Then, only when the user has the license to drive the motorcycle and the user is qualified to utilize the rental bike facilities RT1 and RT2, the search unit 201 considers that a section route including the motorcycle as the transportation is a candidate as in the fourth section route.

In the second example, the search unit 201 reflects the user's emotion and sets a priority to each of the third section route and the fourth section route in cooperation with the artificial intelligence module execution unit 203 by a method similar to the method described with reference to FIG. 8 in the first example.

Here, the fourth section route is the route including the motorcycle in the transportation. When emotion information is generated for the route including the motorcycle in the transportation in this manner, the artificial intelligence module execution unit 203 executes the following processing.

That is, during the generation of the emotion information, the artificial intelligence module execution unit 203 generates the emotion of the same quality as in an emotion to be held by the user to the transportation including the motorcycle, on the basis of user's state as of this moment which is indicated by the user state information and an environment indicated by environment information included in emotion response request information, and the unit reflects the user's emotion and sets a value of the emotion information.

For example, it is assumed that the user holds an emotion that the user does not want to use a motorcycle as much as possible when wearing glasses. In this case, the artificial intelligence module execution unit 203 generates the emotion of the same quality as in the emotion that the user does not want to use the motorcycle as much as possible in a state where the user wears the glasses. Then, in a case where the user wears the glasses, the artificial intelligence module execution unit 203 compares one section route including the motorcycle as transportation with another section route that does not include the motorcycle, and the unit sets a lower value to the emotion information concerned with the one section route.

Furthermore, for example, it is assumed that the user holds an emotion that the user does not want to use the motorcycle as much as possible when wearing hair dressing. In this case, the artificial intelligence module execution unit 203 generates an emotion of the same quality as in the emotion that the user does not want to use the motorcycle as much as possible in a state where the user is wearing the hair dressing. Then, in a case where the user wears the hair dressing, the artificial intelligence module execution unit 203 compares one section route including the motorcycle as the transportation with another section route that does not include the motorcycle, and the unit sets a lower value to the emotion information concerned with the one section route.

Additionally, for example, it is assumed that the user holds an emotion that the user may use the motorcycle if it is fine and that the user does not want to use the motorcycle as much as possible if it is rainy. In this case, the artificial intelligence module execution unit 203 generates an emotion of the same quality as in the emotion that the user may use the motorcycle if it is fine, but generates an emotion of the same quality as in the emotion that the user does not want to use the motorcycle as much as possible if it is rainy. Then, if it is fine, the artificial intelligence module execution unit 203 does not make a difference between the one section route including the motorcycle as the transportation and the other section route that does not include the motorcycle. On the other hand, if it is rainy, the unit compares the one section route including the motorcycle as the transportation with the other section route that does not include the motorcycle, and sets a lower value to the information concerned with the one section route.

There has been described above the example of the method by which the artificial intelligence module execution unit 203 generates the emotion information when the section route includes the motorcycle as the transportation. However, the method by which the artificial intelligence module execution unit 203 generates the emotion information is not limited to the illustrated method. For example, the artificial intelligence module execution unit 203 may reflect user's emotion to traffic jam, or user's emotion to a time zone to use the motorcycle when the motorcycle is used, and may generate emotion information. Furthermore, the case where the transportation includes the motorcycle has been described. However, for example, an emotion to a taxi or a dispatch service may be generated in combination with information on the dispatch service including the taxi.

Third Example

Figure 10:
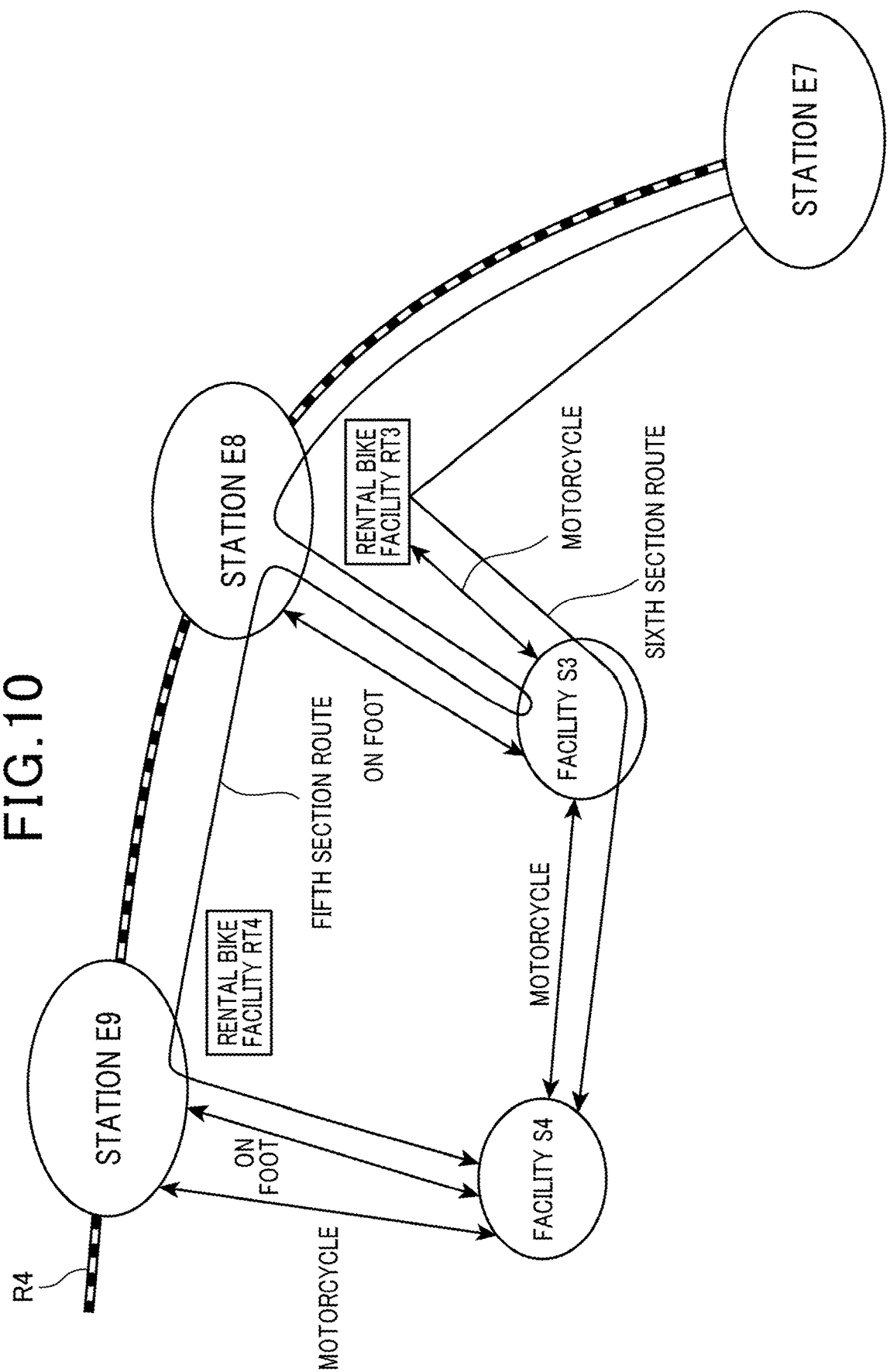
FIG. 10 is a diagram for use in explanation of setting of a priority of a section route.

FIG. 10 is a diagram for use in explanation of a third example.

In the third example, a station E7, a station E8 and a station E9 are present along a route R4 concerned with a train. At a position corresponding to the station E8, a facility S3 set as a transit point by a user is present. When the user moves on foot from the station E8 to the facility S3, time of about 10 minutes is required. At a position corresponding to the station E9, a facility S4 set as a destination by the user is present. When the user moves on foot from the station E9 to the facility S4, time of about 10 minutes is required. A rental bike facility RT3 is present in the vicinity of the station E8 and a rental bike facility RT4 is present in the vicinity of the station E9. A relation between the rental bike facility RT3 and the rental bike facility RT4 is similar to the relation between the rental bike facility RT1 and the rental bike facility RT2 according to the second example.

In the third example, the following section is present. That is, there is a section extending from the station E7 as a start point via the facility S3 as a transit point to the facility S4 of the destination. Furthermore, in the third example, two candidates for a section route are present in the section. That is, as the candidate for the section route, there is a fifth section route along which the user moves by train from the station E7 via the route R4 to the station E8, gets off the train at the station E8 to move on foot to the facility S3 of the transit point, completes stay at the facility S3, then moves on foot from the facility S3 to the station E8, moves by train from the station E8 via the route R4 to the station E9, and gets off the train at the station E9 to move on foot to the facility S4 of the destination. When the user utilizes the fifth section route, the user completes stay at the facility S4 and then moves on foot to the station E9.

Furthermore, as the candidate for the section route, there is a sixth section route along which the user moves by train from the station E7 via the route R4 to the station E8, gets off the train at the station E8 to move to the rental bike facility RT3, rents a motorcycle at the rental bike facility RT3, moves on the rented motorcycle from the rental bike facility RT3 to the facility S3 of the transit point, completes stay at the facility S3, and then moves from the facility S3 directly to the facility S4 by use of the motorcycle. When the user utilizes the sixth section route, the user completes stay at the facility S4, and then moves to the rental bike facility RT4 (which may be the rental bike facility RT3) by use of the motorcycle.

In the third example, time required for the movement from the station E7 to the facility S3 of the transit point and time required for the movement from the facility S3 to the facility S4 of the destination are much shorter in the sixth section route than in the fifth section route. It is assumed that, when one or more transit points are set in addition to the destination, time required for the movement is often shorter in the section route including the motorcycle in the transportation as compared with the section route that does not include the motorcycle in the transportation. This is because in case of utilizing the train, a bus or the like during the movement between the facilities, it is necessary to move to the station or a stop for utilizing the train or the bus, and additionally waiting time is generated at the station or the stop. Furthermore, detouring more often occurs as compared with a route along a road connecting the facilities. On the other hand, in case of using the motorcycle, it is possible to move from the facility directly to the other facility via the route along the road connecting the facilities.

Thus, when the section includes one or more transit points in addition to the destination, the search unit 201 executes the following processing.

Specifically, as the candidates for the section route of the section including one or more transit points in addition to the destination, there are the section route including the motorcycle as the transportation, and the section route that does not include the motorcycle as the transportation, and the time required for the movement is shorter in the section route including the motorcycle as the transportation than in the section route that does not include the motorcycle as the transportation. In this case, the search unit 201 executes the following processing. That is, the search unit 201 sets a priority of the section route including the motorcycle as the transportation higher than a priority of the section route that does not include the motorcycle as the transportation, regardless of magnitudes of a value of emotion information concerned with the section route including the motorcycle as the transportation and a value of emotion information concerned with the section route that does not include the motorcycle as the transportation. Note that during the setting of the priority, the search unit 201 may use a condition that the value of the emotion information concerned with the section route including the motorcycle as the transportation is in excess of a predetermined threshold. Furthermore, the above setting of the priority is based on an assumption that the user does not set a condition of not using the motorcycle to a search condition.

As described above, when the section includes one or more transit points in addition to the destination, the search unit 201 reflects the movement to the transit point and the movement from the transit point and performs the route search.

Now, as shown in the flowchart FB of FIG. 5, after executing the route search processing in the step SB4, the search unit 201 generates search result information on the basis of a result of the search result processing (step SB5).

The search result information is information indicative of the route searched in the route search processing. The search result information has information indicative of the priority of each section route, when a plurality of candidates for the section route are present in a predetermined section of the searched route and the priority of each section route is set.

Subsequently, the search unit 201 controls the server communication unit 21 to transmit, to the terminal 2, the search result information generated in the step SB5 (step SB6). Upon receiving search instruction data as HTTP request, the search unit 201 transmits the search result information as HTTP response to the terminal 2.

As shown in the flowchart FA of FIG. 5, the terminal control unit 10 of the terminal 2 receives the search result information (step SA6).

Subsequently, the terminal control unit 10 displays a search result screen in the touch panel 12 on the basis of the search result information received in the step SA6 (step SA7).

The search result screen displays information indicative of the route searched by the route search processing of the search unit 201 of the control server 3. Furthermore, the search result screen displays a list of information indicative of each section route, when a plurality of candidates for the section route are present in the predetermined section of the searched route and the priority of each section route is set. In this case, the section route having a higher priority is displayed as the section route recommended to be utilized, with a higher priority. For example, the section route having the higher priority is displayed at an upper position of the search result screen. That is, as for the section where a plurality of candidates for the section route are present, the user's emotion is reflected and the section route recommended to the user to utilize is displayed with a high priority.

The user can accurately recognize a route extending from a departure point to the destination (a route extending via the transit point to the destination when the transit point is set) with reference to the search result screen. Furthermore, as to the section where a plurality of candidates for the section route are present, each section route is displayed with the priority in which the user's emotion is reflected, so that the user can accurately select the section route suited for the user as the section route to utilize, with reference to the search result screen.

As described above, the information processing system 1 according to the present embodiment includes the search unit 201 that performs route search on the basis of route search information that is input, to output a result of the search by the search unit 201. Then, the search unit 201 performs the route search on the basis of the route search information, and emotion information obtained from artificial intelligence that generates an emotion of the same quality as in an emotion of a user (a searcher).

According to this configuration, an information processing device can reflect the user's emotion and search for a route suited for the user during the route search.

Furthermore, in the present embodiment, the emotion generated by the artificial intelligence module M is generated on the basis of user input information (the information that is input by the searcher) and the emotion element information (the information based on an activity of the searcher).

According to this configuration, the artificial intelligence module M can reflect user's intentional input and the user's activity and accurately generate the emotion of the same quality as in the user's emotion.

Additionally, in the present embodiment, the search unit 201 performs the route search on the basis of selection information on a route selected as a route to be utilized by the user in the past, in addition to the route search information and the emotion information.

According to this configuration, the search unit 201 can reflect the route selection performed by the user in the past and accurately search for the route during the route search.

Furthermore, in the present embodiment, a target of the route to be searched by the search unit 201 includes a route along which the user uses the motorcycle (a vehicle) that can be rented by the user.

According to this configuration, the search unit 201 can reflect the user's emotion and search for various routes also on the assumption that the user utilizes the motorcycle.

Note that the target of the route to be searched by the search unit 201 is not limited to "the route along which the user uses the motorcycle (the vehicle) that can be rented", and includes "a route to move by a vehicle". Examples of "the route to move by the vehicle" include a route along which a taxi (including a dispatch service) is used as transportation, a route along which a rental vehicle that is not limited to the motorcycle (e.g., an automobile or a bicycle) is used as the transportation, and a route along which a shared car (motorcycle, automobile, bicycle or the like) is used as the transportation. Since "the route to move by the vehicle" is considered as the target of the route to be searched by the search unit 201, the route search from a larger number of choices is possible.

Additionally, in the present embodiment, the artificial intelligence module M generates the user's emotion to the use of the motorcycle.

According to this configuration, the search unit 201 can reflect the user's emotion and appropriately judge validity of the searching for the route involving the utilization of the motorcycle. Note that the target of the route to be searched by the search unit 201 includes "the route to move by the vehicle". Then, the artificial intelligence module M generates the user's emotion to the movement by the vehicle.

According to this configuration, the search unit 201 can reflect the user's emotion and appropriately judge the validity of the searching for the route involving the movement by the vehicle.

Furthermore, in the present embodiment, the route search information includes information on the departure point and information on the destination, and additionally includes information on a transit point when the transit point to pass before reaching the destination is set. Then, the search unit 201 reflects the movement to the transit point and the movement from the transit point and performs the route search, when the route search information includes the information on the transit point.

According to this configuration, the search unit 201 can accurately search for the route on the basis of presence of the transit point, when the transit point is set.

Additionally, as described above, the transit point is not limited to a specified place such as the station of public transport, and means an arbitrary point. When the arbitrary point can be searched as the transit point, an entire action for the movement can be optimized.

Additionally, in the present embodiment, the terminal 2 (an information processing device) includes the touch panel 12 (an input unit) (an output unit) into which the route search information is input and which outputs (displays) the result of the route search, and the terminal control unit 10 that controls the touch panel 12. Then, the terminal control unit 10 controls the touch panel 12 to display the result of the route search performed on the basis of the route search information input into the touch panel 12 and the emotion information obtained from the artificial intelligence module M that generates the emotion of the same quality as in the user's emotion.

According to this configuration, the terminal 2 can present, to the user, the route searched so that the user's emotion is reflected.

Note that each above described embodiment merely shows one aspect of the present invention, and can be arbitrarily modified and applied within the gist of the present invention.

For example, in the above described embodiment, the terminal control unit 10 outputs the result of the route search by display means, but may be configured to output by another means such as voice.

Furthermore, for example, in the above described embodiment, it has been described that the vehicle that can be rented by the user is "the motorcycle", but the vehicle is not limited to the motorcycle, and examples of the vehicle may include the automobile and an auto tricycle.

Additionally, for example, in the above described embodiment, one artificial intelligence module M has a state where all data constituting the module is stored in the control server 3. However, a part of the artificial intelligence module M may be stored in one or more external devices that can communicate with the control server 3 (which may be the terminal 2), and the artificial intelligence module M may be configured to function in cooperation with program stored in the external device.

In addition, the function blocks of the terminal 2 and the control server 3 can be arbitrarily achieved by hardware and software, and a specific hardware configuration is not suggested.

Furthermore, a processing unit of the flowchart shown in the drawing is divided in accordance with main processing contents in order to facilitate understanding of processing of each device. The present invention is not restricted by a method of dividing the processing into units or a name of each unit. The processing of each device can be divided into a larger number of processing units in accordance with the processing contents. Furthermore, the processing can be divided so that one processing unit includes more processing. Additionally, processing orders in the above flowcharts are not limited to the orders in the shown examples as long as similar processing can be performed.

REFERENCE SIGN LIST 2 terminal (information processing device)
3 control server (information processing device)
10 terminal control unit (control unit)
12 touch panel (input unit, and output unit)
201 search unit
M artificial intelligence module (artificial intelligence)

The invention claimed is:

1. An information processing system comprising a control server having a server-side CPU, wherein the server-side CPU is configured to:
   perform route search based on route search information that is input, to output a result searched;
   perform the route search based on the route search information, and emotion information obtained from artificial intelligence that generates an emotion of a same quality as in an emotion of a searcher, and
   perform the route search based on selection information on a route selected as a route to be utilized by the searcher in the past, in addition to the route search information and the emotion information.

2. The information processing system according to claim 1, wherein the emotion generated by the artificial intelligence is generated based on at least information that is input by the searcher and information based on an activity of the searcher.

3. The information processing system according to claim 1, wherein the route search information includes information on a departure point and information on a destination, and additionally includes information on a transit point when the transit point to pass before reaching the destination is set, and
   the server-side CPU reflects movement to the transit point and movement from the transit point and performs the route search, when the route search information includes the information on the transit point.

4. An information processing system comprising a control server having a server-side CPU, wherein the server-side CPU is configured to:
   perform route search based on route search information that is input, to output a result searched; and
   perform the route search based on the route search information, and emotion information obtained from artificial intelligence that generates an emotion of a same quality as in an emotion of a searcher,
   wherein a target of a route to be searched by the server-side CPU includes a route to move by a vehicle, and the artificial intelligence generates the emotion of the searcher to the movement by the vehicle.

5. An information processing device comprising:
   a touch panel display into which route search information is input, and a result of route search is displayed, and a device-side CPU that controls the touch panel display, wherein
   the device-side CPU is configured to control the touch panel display to display the result of the route search performed based on the route search information input and emotion information obtained from artificial intelligence that generates an emotion of a same quality as in an emotion of a searcher,
   a target of a route to be searched includes a route to move by a vehicle, and
   the artificial intelligence generates the emotion of the searcher to the movement by the vehicle.

* * * * *